US006493727B1

(12) United States Patent
Huang et al.

(10) Patent No.: US 6,493,727 B1
(45) Date of Patent: Dec. 10, 2002

(54) SYSTEM AND METHOD FOR SYNCHRONIZING DATABASE IN A PRIMARY DEVICE AND A SECONDARY DEVICE THAT ARE DERIVED FROM A COMMON DATABASE

(75) Inventors: Andrew J. Huang, Boise, ID (US); Marco Caccia, Milan (IT); Michael D. Koontz, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/499,322

(22) Filed: Feb. 7, 2000

(51) Int. Cl.[7] .............................................. G06F 17/00
(52) U.S. Cl. ...................................................... 707/201
(58) Field of Search ....................................... 707/1–206

(56) References Cited

U.S. PATENT DOCUMENTS

| | | | | |
|---|---|---|---|---|
| 5,596,706 A | * | 1/1997 | Shimazaki et al. | 707/204 |
| 5,884,324 A | * | 3/1999 | Cheng et al. | 707/201 |
| 5,978,813 A | * | 11/1999 | Foltz et al. | 707/201 |
| 6,134,560 A | * | 10/2000 | Kliebhan | 707/104 |
| 6,199,074 B1 | * | 3/2001 | Kern et al. | 707/204 |
| 6,223,187 B1 | * | 4/2001 | Boothby et al. | 707/10 |
| 6,243,705 B1 | * | 6/2001 | Kucala | 707/10 |
| 6,324,693 B1 | * | 11/2001 | Brodersen et al. | 707/203 |
| 6,330,568 B1 | * | 12/2001 | Boothby et al. | 707/200 |

FOREIGN PATENT DOCUMENTS

WO     WO 95/08809 A2    3/1995

OTHER PUBLICATIONS

Kling et al. (Management of a Remote Backup Copy for Disaster Recovery) ACM Transactions on Database Systems. vol. 16, No. 2, Jun. 1991, pp. 338–368.*

* cited by examiner

*Primary Examiner*—John Breene
*Assistant Examiner*—Leslie Wong

(57) ABSTRACT

A system and method are provided for maintaining a common consistent database in a primary device and in a secondary device. The method includes the steps of determining a need for a merger of a first database maintained in the primary device and a second database maintained in the secondary device, the first and second databases being derived from common database. The method also includes the steps of merging the first database and the second database, resulting in a merged database and assigning a sequence identifier to the merged database. Finally the present method includes the step of synchronizing the merged database in the primary and secondary devices.

12 Claims, 11 Drawing Sheets

Original Database 609

| Unit | Person |
|---|---|
| XXX123 | John |
| XXX345 | Mom |
| XXX567 | Uncle Bob |
| XXX789 | Susan |
| XXX333 | Mary |
| XXX676 | William |

First Database

| Unit | Person |
|---|---|
| XXX345 | Mom |
| XXX567 | Uncle Bob |
| XXX789 | Aunt Susan |
| XXX333 | Mary Ann |
| XXX676 | Bill |

176b

Second Database

| Unit | Person |
|---|---|
| XXX345 | Mother |
| XXX333 | Mary |
| XXX567 | Uncle Bob |
| XXX789 | Aunt Susie |
| XXX676 | William |

First Database Updates

| Unit | Operation |
|---|---|
| XXX123 | Deleted |
| XXX789 | Modified |
| XXX333 | Modified |
| XXX676 | Modified |

616

First Database Updates

| Unit | Operation |
|---|---|
| XXX123 | Deleted |
| XXX345 | Modified |
| XXX789 | Modified |
| XXX333 | Alt Order |

Merged Database

| Unit | Person |
|---|---|
| XXX345 | Mother |
| XXX333 | Mary Ann |
| XXX567 | Uncle Bob |
| XXX789 | Aunt Susan |
| XXX676 | Bill |

FIG. 11D

SYSTEM AND METHOD FOR SYNCHRONIZING DATABASE IN A PRIMARY DEVICE AND A SECONDARY DEVICE THAT ARE DERIVED FROM A COMMON DATABASE

CROSS REFERENCE TO RELATED APPLICATION

This document is related to co-pending U.S. patent application entitled "System and Method for Merging Databases," filed on even date herewith and assigned Ser. No. 09/499,192."

TECHNICAL FIELD

The present invention is generally related to the field of software database management and, more particularly, is related to a system and method for synchronizing databases.

BACKGROUND OF THE INVENTION

Technology has become pervasive in nearly all aspects of society. For example, the explosion in digital computing devices has changed the way people live and work. Personal computers have become common place in homes and in businesses. This computer technology has opened new avenues of communications such as email and other data communications that has provided unprecedented availability to information, for example, on the world wide web (WWW) of the Internet. Also, in the workplace computer technology has facilitated telecommuting and other conveniences where employees may work at home and have full access to office computer systems, etc.

With current mobility of systems, situations arise in which the same information, such as records in a database, is stored in two different places. The database may be subject to change in both places. This can create a problem in that different changes can be made to the database in the different locations, resulting in two different databases that no longer hold the same information. This is problematic when it is desirable that the database remain in a single consistent form in both locations.

SUMMARY OF THE INVENTION

In light of the foregoing, a system and method are provided for maintaining a database in a primary device and in a secondary device. In one embodiment, the method broadly comprises the step of determining a need for a merger of a first database maintained in the primary device and a second database maintained in the secondary device, the first and second databases being derived from a common database. The method also includes the steps of merging the first database and the second database, resulting in a merged database and assigning a sequence identifier to the merged database. Finally the present method includes the step of synchronizing the merged database in the primary and secondary devices.

In another embodiment, the present invention provides for a primary system located in a primary device for maintaining a database in the primary device and in the secondary device. The primary system includes a processor electrically coupled to a local interface and a memory electrically coupled to the local interface, where the local interface may be, for example, a data bus and accompanying control bus. The primary system also includes primary synchronization logic stored on the memory and executed by the processor. The primary synchronization logic comprises logic to determine a need for a merger of a first database maintained in the primary device and a second database maintained in the secondary device, where the first and second databases are derived from a common database. The primary synchronization logic also includes logic to merge the first and second databases, resulting in a merged database, logic to assign a sequence identifier to the merged database, and logic to synchronize the merged database in the primary and secondary devices.

The primary device operates in conjunction with the secondary device to maintain the database in both devices. Thus, according to another embodiment, the present invention provides for a secondary system in a secondary device that interacts with the primary system in the primary device. The secondary system in the secondary device includes a processor electrically coupled to a local interface and a memory electrically coupled to the local interface. The secondary system also includes a secondary synchronization logic stored on the memory and executed by the processor. The secondary synchronization logic includes logic to receive and store a second database from the primary device, the second database being identical to a first database stored in the primary device. The secondary synchronization logic also comprises logic to receive and store a sequence identifier from the primary device, the sequence identifier being associated with the second database, logic to maintain an alteration status of the second database, and logic to transmit the alteration status of the second database to the primary device.

The present invention provides a distinct advantage in that it is quite robust, maintaining synchronization between the first and second databases despite breakdowns in data communications, etc.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 11A–11D are charts that illustrate the operation of merger rules during a merger operation of FIG. 10.

DETAILED DESCRIPTION OF THE INVENTION

Figure 1:
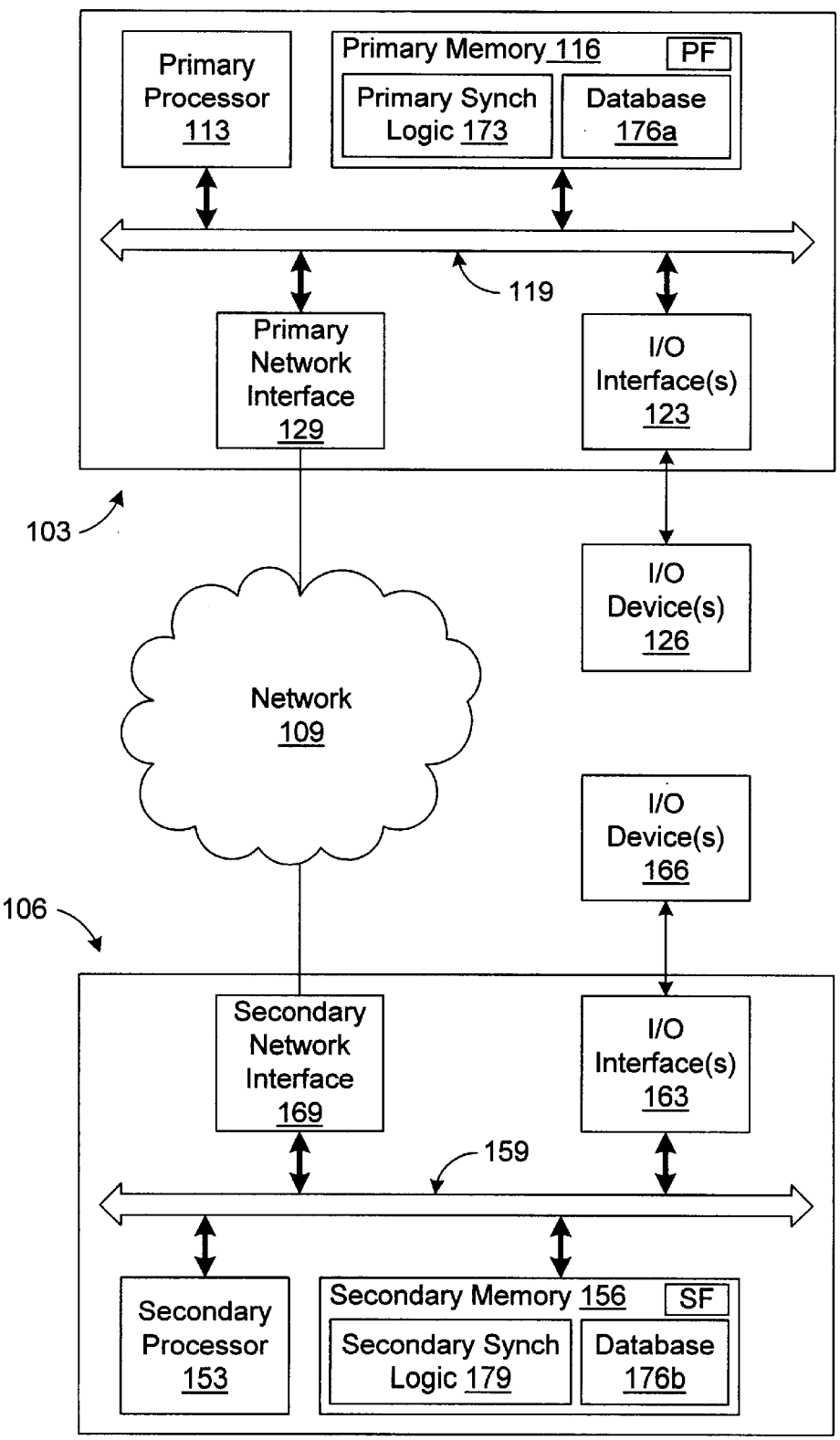
FIG. 1 is a block diagram of a database synchronization system according to an embodiment of the present invention.

With reference to FIG. 1, shown is a database synchronization system 100 according to an embodiment of the present invention that is intended to be a nonlimiting example of a possible implementation. The database synchronization system 100 includes a primary device 103 and a secondary device 106 that are in electrical communication via a network 109. The primary and secondary devices 103 and 106 each may comprise, for example, a computer system. In this manner, the primary device 103 includes a primary processor 113 and a memory 116, both of which are electrically coupled to a local interface 119. The local interface 119 may comprise, for example, one or more data busses and control busses.

The primary device 103 is linked to the network 109 via a primary network interface 129 that makes data from the network 109 available on the local interface 119 and vice versa. Also, the primary device 103 also includes one or more input/output interfaces 123 that provide a link between one or more input/output devices 126 and the local interface 119.

The secondary device 106 includes a secondary processor 153 and a secondary memory 156 that are both electrically coupled to a local interface 159. The secondary device 106 also includes one or more input/output interfaces 163 that couples one or more input/output devices 166 to the local interface 159. The secondary device 106 also includes a secondary network interface 169 that links the network 109 to the local interface 159.

Note that the memories 116 and 156 may comprise various volatile and non-volatile memory devices. These devices include, for example, random access memory (RAM), read-only memory (ROM), a hard drive, a combination compact disk drive with a compact disk, a combination floppy disk drive with a floppy disk, or other suitable data storage device. With respect to the memories 116 and 156, the term "volatile" refers to those memory devices that do not maintain data during a loss of power, whereas the term "non-volatile" refers to those devices that maintain data during a loss of power.

On the input side, the input/output devices 126 and 166 of the primary and secondary devices 103 and 106 may comprise, for example, a keyboard, keypad, mouse, microphone, or other suitable input device. On the output side, the input/output devices 126 may comprise, for example, display devices such as cathode ray tubes (CRTs), liquid crystal displays, indicators, lights, light emitting diodes, printers, or other output devices.

The primary device 103 also includes primary synchronization logic 173 that is stored on the memory 116 and executed by the primary processor 113. Also stored on the memory 116 is a first database 176a. The first database 176a may contain a number of records having predetermined fields depending upon the particular function of the first database 176a, as known by those skilled in the art. For example, the first database 176a may comprise an address book or other similar information. The information stored in the predetermined fields is not limited in any sense, the present invention applying to virtually all databases. Also, a primary dirty flag PF is stored on the memory 116, the function of which will be described. The primary dirty flag PF may comprise, for example, a bit that is set "high" (such as a logical "1") or "low" (such as a logical "0") depending upon a particular state of the first database 176a, as will be discussed.

The secondary device 106 includes secondary synchronization logic 179 that is stored on the secondary memory 156 and executed by the secondary processor 153. Also stored on the secondary memory 156 is a second database 176b. Ideally, the second database 176b is identical to the first database 176a. This may be the case, for example, when the first and second databases 176a and 176b are first placed in the memories 116 and 156, having been derived from a common database. This may also be the case when the second database 176b is a direct copy of the first database 176a that is written from the primary device 103 to the secondary device 106. Also, a secondary dirty flag SF is stored on the secondary memory 156, the function of which will be described. The secondary dirty flag SF may comprise, for example, a bit that is set "high" (such as a logical "1") or "low" (such as a logical "0") depending upon the state of the second database 176b as will be discussed.

Although the first and second databases 176a and 176b may be identical to each other to start, they may be altered independently from each other when one or more users manipulate the input/output devices 126 and 166. This presents a problem in that the content of the first and second databases 176a and 176b may differ significantly, while, according to the present invention, it is desirable that the information content of both the first and second databases 176a and 176b remain identical.

Accordingly, the present invention provides the ability to maintain the first and second databases 176a and 176b so as to ensure that they have the same content that reflects all individual changes made to either the first or the second databases 176a and 176b. To facilitate the maintenance of the first and second databases 176a and 176b, a synchronization protocol is established between the primary and secondary devices 103 and 106. The following discussion provides a number of different scenarios that illustrate this synchronization protocol.

Figure 2:
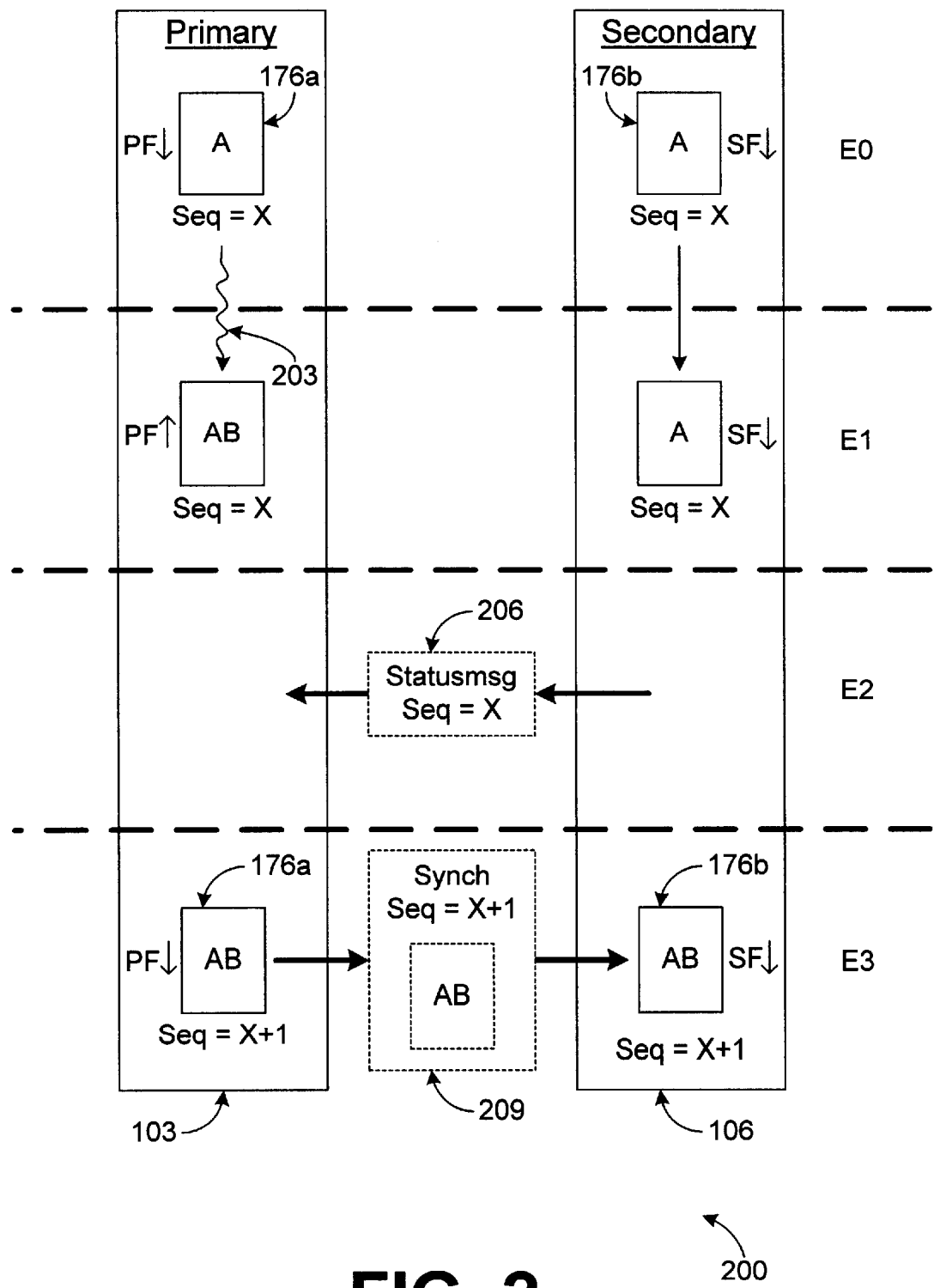
FIG. 2 is a block diagram of a first scenario of database synchronization according to the database synchronization system of FIG. 1.

With reference then, to FIG. 2, shown is a block diagram of a first scenario 200 in which a change occurs to one of the first and second databases 176a and 176b according to an embodiment of the present invention. The first scenario 200 entails a number of events E0–E3 regarding the first and second databases 176a and 176b that occur over time. During the first event E0, the first database 176a and the second database 176b are identical as they both include content "A." A sequence number X is assigned to both of the first and second databases 176a and 176b that indicates that they were derived from a single common database. The primary dirty flag PF is initially set low (PF↓) in the primary device 103 and the secondary dirty flag SF in the secondary device 106 is also initially set low (SF↓) at this time. This indicates that no alterations have occurred to the first and second databases 176a and 176b, respectively. Note that the term "dirty" with reference to the first and second databases 176a and 176b refers to the fact that the content of the respective database has been altered and therefor potentially no longer coincides with the content of the other database.

Next, in event E1, the first database 176a experiences an alteration 203 via the input/output devices 126, whereas the second database 176b remains the same, resulting in a first database 176a with content "AB" and a second database 176b with content "A." The primary dirty flag PF is set "high" (PF↑) upon the occurrence of the alteration 203.

The secondary dirty flag SF remains in a "low" (SF↓) position indicating that no alteration has occurred to the second database 176b. In the event E2 that follows, the secondary device 106 transmits an alteration status message 206 with a current sequence number retained by the secondary device 106 to the primary device 103. The transmission of the alteration status message 206 occurs in response to a synchronizing event between the primary and secondary devices 103 and 106. In cases where the primary and secondary devices 103 and 106 are not always in electrical communication with each other, the synchronizing event may be the actual establishment of data communications between the primary and secondary devices 103 and 106. Alternatively, the synchronizing event may include the transmission of a status request from the primary device 103 to the secondary device 106 in the cases where the primary and secondary devices 103 and 106 are in continuous electrical communication with each other, where the status requests are transmitted periodically or according to predetermined criteria. The synchronizing event may also include other occurrences as well.

According to the first scenario 200, when the secondary dirty flag SF is "low" (SF↓), the secondary device 106 transmits alteration status message 206 to the primary device 103 in response to the synchronizing event. The alteration status message 206 indicates that the second database 176b has not experienced any changes from its original form with content "A." The sequence identifier X is transmitted with the alteration status message 206 providing information as to the original common database from which the second database 176b was derived. This original common database is stored in the primary device 103 as will be discussed in later text.

In the final event E3, the first and second databases 176a and 176b undergo a synchronization 209. The synchronization 209 comprises replacing the first and second databases 176a and 176b with a single common database that incorporates all alterations 203 of previous first and second databases 176a and 176b, as well as generating and a new sequence identifier that accompanies the common database. In addition, the primary and secondary dirty flags PF and SF are set "low" due to the fact that the first and second databases 176a and 176b are now identical.

Note that in the first scenario 200, the only alteration 203 occurred in the first database 176a. Consequently, the synchronization 209 is performed by merely transmitting a copy of the altered first database 176a to the secondary device 106 to replace the second database 176b since there were no changes to the second database 176b. In this manner, the alteration 203 to the first database 176a is reflected in the content "AB" of both the first and second databases 176a and 176b.

"Thus, after a synchronization 209 occurs, the first and second databases 176a and 176b are identical with an identical sequence identifier. Note that the sequence identifiers need not be consecutive, but may be obtained from an alphabet of sequence identifiers as described in co-pending U.S. patent application entitled "System and Method for State Synchronization" and assigned Ser. No. 09/499,320, filed on even date herewith and incorporated herein by reference in its entirety."

Figure 3:
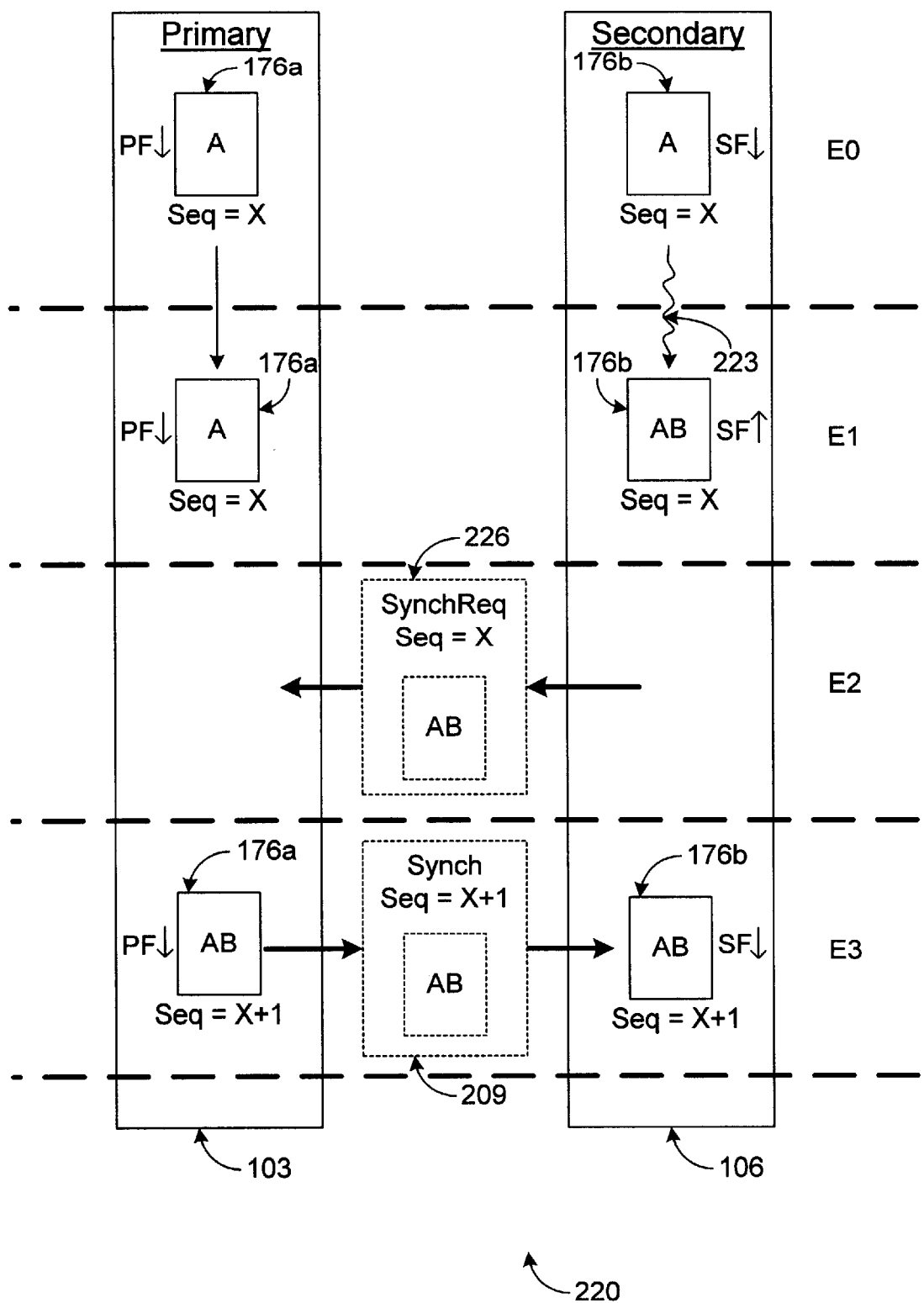
FIG. 3 is a block diagram of a second scenario of database synchronization according to the database synchronization system of FIG. 1.

With reference to FIG. 3, shown is a block diagram of a second scenario 220 in which a change occurs to one of the first and second databases 176a and 176b according to an embodiment of the present invention. Once again in event E0, the first database 176a and the second database 176b in the primary and secondary devices 103 and 106 are identical as they both include content "A." A sequence number X is assigned to both the first and second databases 176a and 176b that indicates that they were derived from a single common database. Also, the primary and secondary dirty flags PF and SF are set "low" (↓).

In the next event E1, the second database 176b experiences an alteration 223, resulting in a change from content "A" to content "AB." In such case, the secondary dirty flag SF is set "high" (SF↑) to indicate to the secondary device 106 that an alteration 223 to the second database 176b has occurred. No alteration is experienced in the first database 176a as shown and the primary dirty flag PF remains "low" (PF↓).

Thereafter, in event E2, a synchronization request 226 is transmitted from the secondary device 106 to the primary device 103 in response to an occurrence of the synchronizing event as discussed previously. The secondary device 106 transmits the synchronization request 226 as opposed to a status message 206 to the primary device 103 when the secondary dirty flag SF is set "high." The synchronization request 226 includes a copy of the second database 176b for purposes of merger in the primary device 103.

Then, in event E3, a synchronization 209 is performed between the primary and secondary devices 103 and 106. In this case, the copy of the second database 1176b with content "AB" is distributed to both the primary and secondary devices 103 and 106 as it was the only database with alterations 223. Note that the synchronization 209 includes the incrementing of the sequence identifier in the primary device 103 and the transmission of the same to the secondary device 106. Also, during the synchronization 209, both the primary and secondary dirty flags PF and SF are set "low" (↓).

Figure 4:
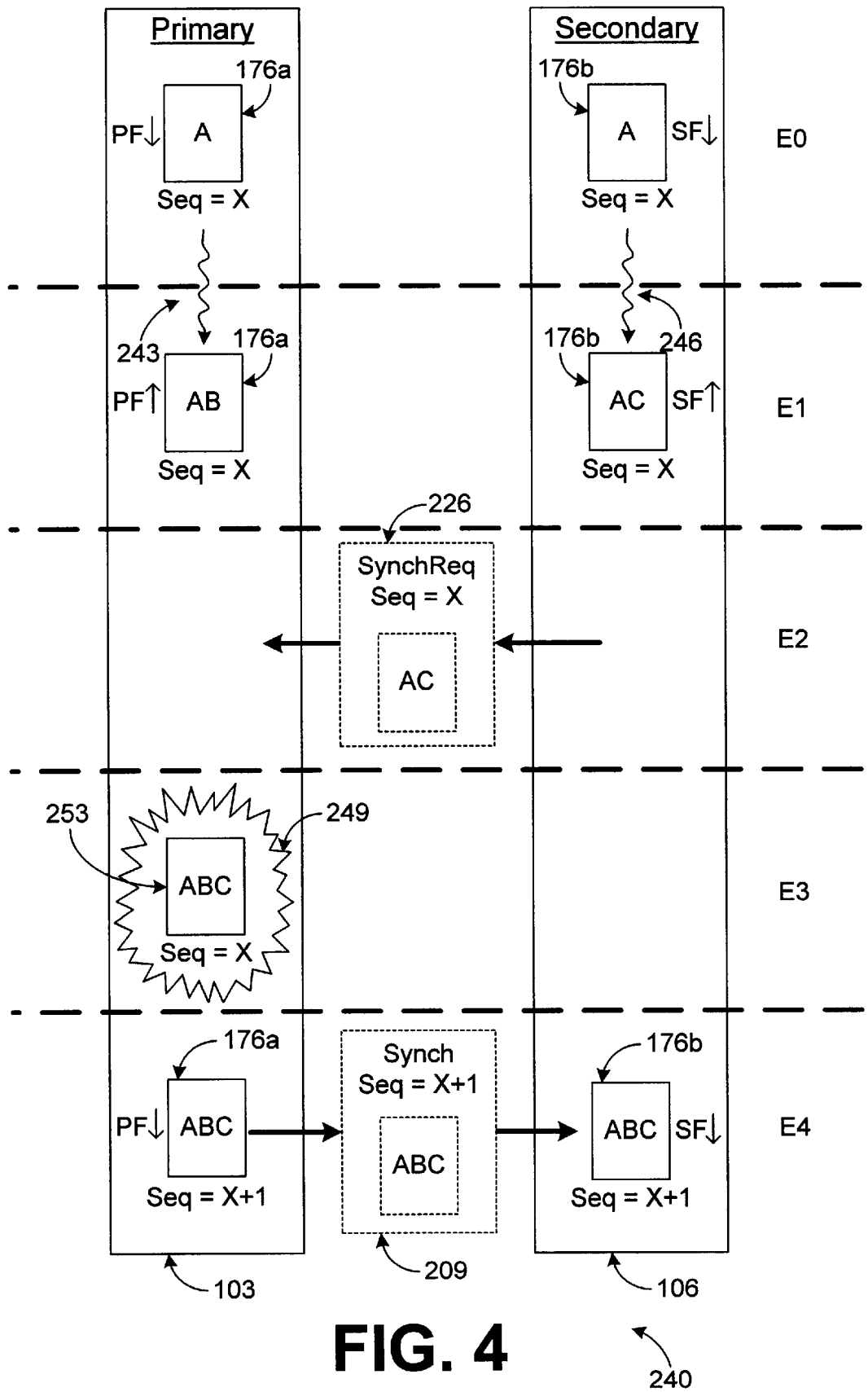
FIG. 4 is a block diagram of a third scenario of database synchronization according to the database synchronization system of FIG. 1.

Turning then, to FIG. 4, shown is a block diagram of a third scenario 240 in which a change occurs to both of the first and second databases 176a and 176b according to an embodiment of the present invention. Beginning with event E0, the first and second databases 176a and 176b are identical as they both include content "A." A sequence number X is assigned to both of the first and second databases 176a and 176b that indicates that they were derived from a single common database. Also, the primary and secondary dirty flags PF and SF are set "low" (↓).

Then, in event E1 a first alteration 243 occurs to the first database 176a that now includes content "AB" and a second alteration 246 occurs to the second database 176b that now includes content "AC." Also, the primary and secondary dirty flags PF and SF are set high (↑) indicating to the primary device 103 and the secondary device 106 that their respective database was altered. Next, in event E2 the secondary device 106 transmits a synchronization request along with the current sequence number and a copy of the second database 176b to the primary device 103 upon the occurrence of a synchronizing event as discussed previously.

Then in event E3, a merger operation 249 is performed in the primary device 103 that creates a new merged database 253 that takes into account changes made to the first and second databases 176a and 176b accordingly. For changes to both the first and second databases 176a and 176b that conflict, a number of rules are followed to effect conflict resolution. Thereafter, in event E4 a synchronization 209 is performed using the new merged database 253. Specifically, the synchronization 209 includes the functions of incrementing the sequence identifier held by the primary device 103 and distributing the new database with the incremented sequence identifier to the secondary device 106. The new merged database 253 then becomes the first and second databases 176a and 176b in the primary and secondary devices 103 and 106, respectively. In addition, during the synchronization 209, the primary and secondary dirty flags PF and SF are set back to "low."

Figure 5:
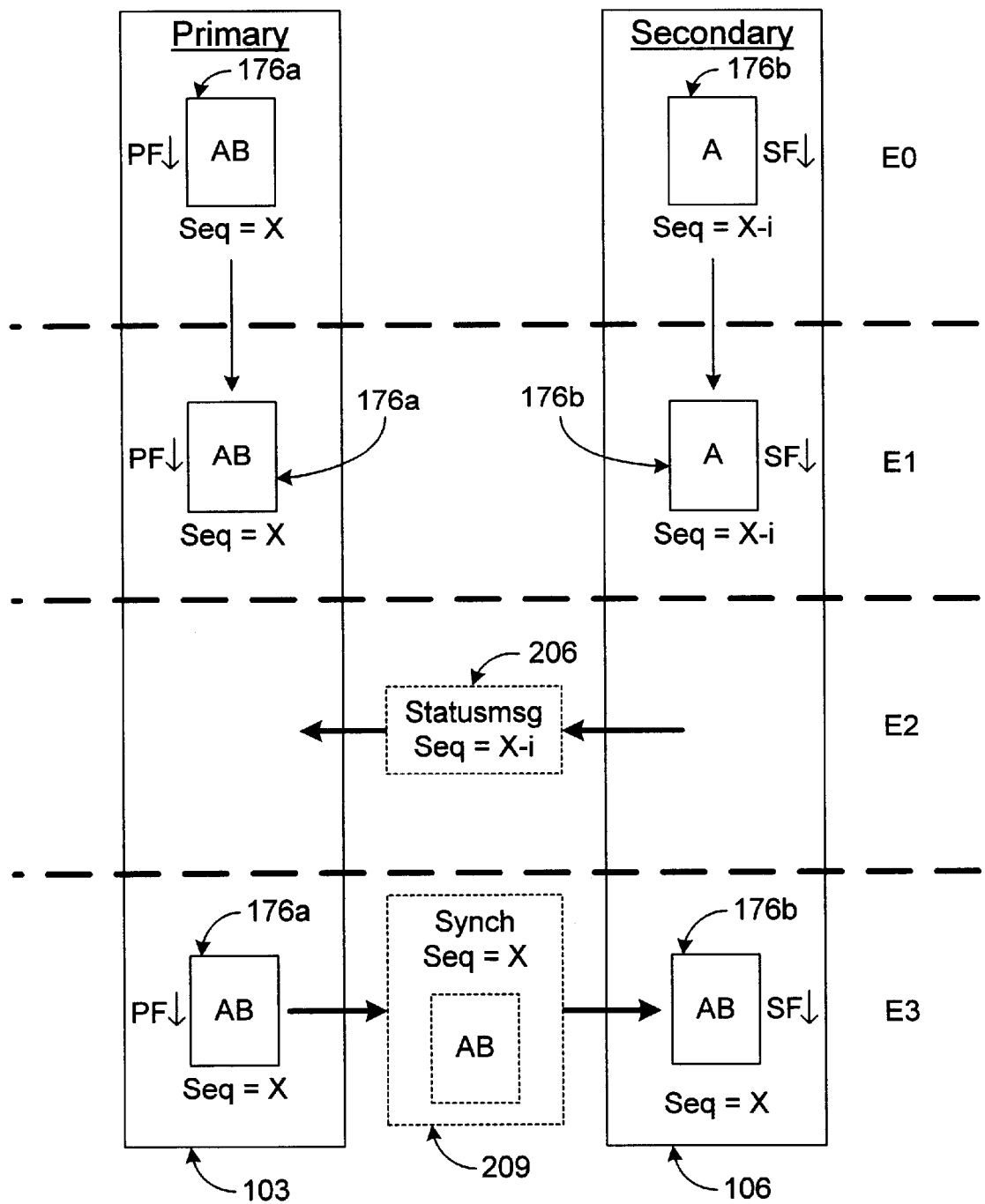
FIG. 5 is a block diagram of a fourth scenario of database synchronization according to the database synchronization system of FIG. 1.

With reference to FIG. 5, shown is a block diagram of a fourth scenario 260 in which the first and second databases 176a and 176b are out of sequence. Beginning with event E0, it is noted that the first database 176a includes content "AB" and the second database 176b includes content "A." This may result, for example, upon the occurrence of one or more failed synchronizations 209 or other situations. Consequently, the current sequence identifier for the first database 176a is X where the current sequence identifier for the second database 176b is X-i. From event E0 to event E1, there are no alterations to either the first and second databases 176a or 176b so the primary and secondary flags PF and SF are set "low." This may occur, for example, when a synchronization 209 fails and the second database 176b remains unchanged.

In event E2, when the secondary device 106 transmits the status message 206 upon the occurrence of a synchronizing event, then the primary device 103 detects a sequence identifier mismatch between X and X-i. In the next event E3 a synchronization is performed with the latest version of the first database 176a to synchronize the second database 176b with the first database 176a. Thus, as the fourth scenario 260 illustrates, a synchronization 209 is performed upon the occurrence of a sequence mismatch.

Figure 6:
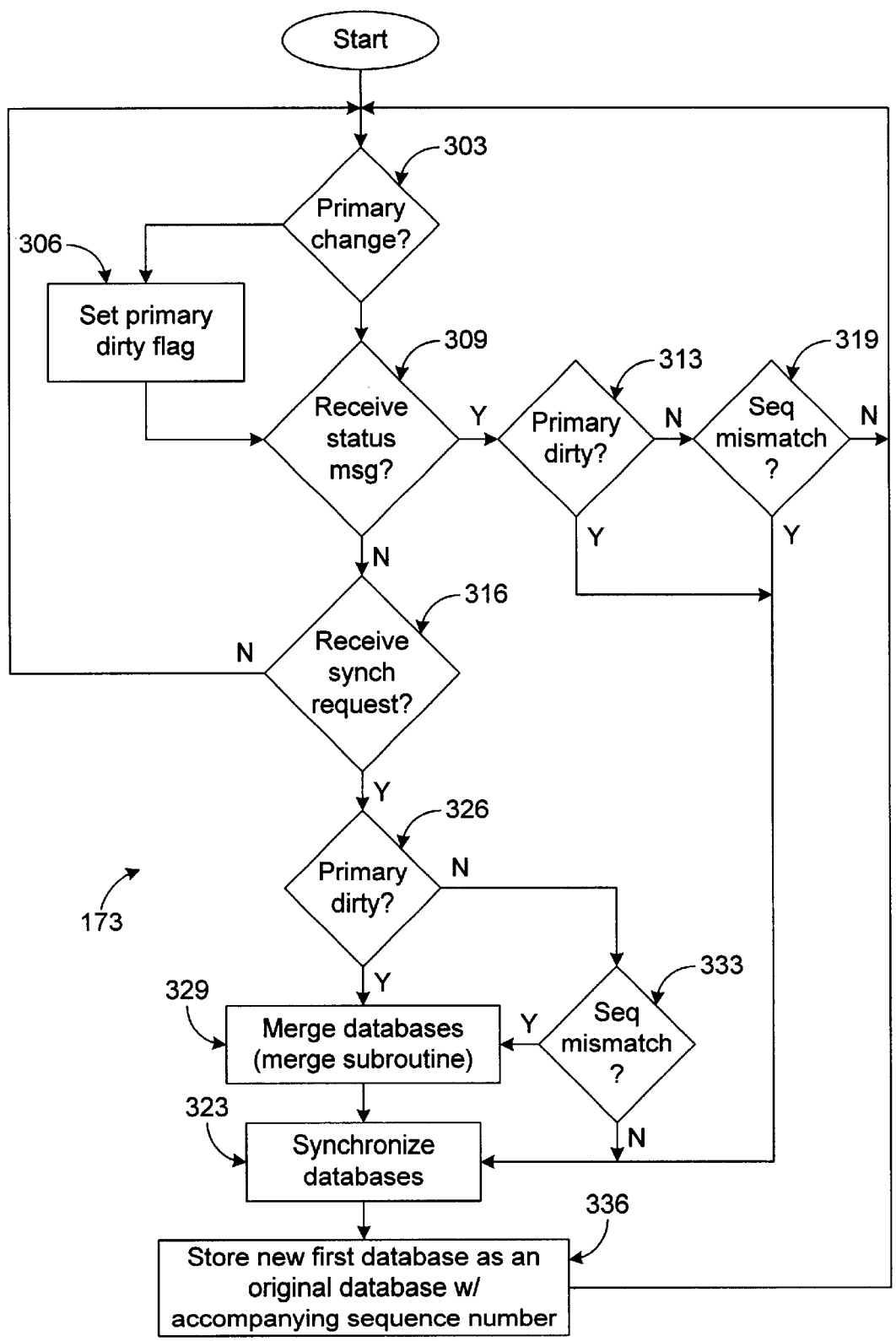
FIG. 6 is a flow chart of primary synchronization logic executed by a primary device in the database synchronization system of FIG. 1.

In light of the above described scenarios, reference is made to FIG. 6 that shows a flow chart of the primary synchronization logic 173 executed by the primary device 103 (FIG. 1). The primary synchronization logic 173 is executed by the primary device 103 in performing the various tasks apportioned to the primary device 103 as illustrated by the above described scenarios 200 (FIG. 2), 220 (FIG. 3), 240 (FIG. 4), and 260 (FIG. 5) in addition to other related functionality. Beginning with block 303, the logic 173 detects whether an alteration has occurred to the first database 176a (FIG. 1). If so, then the logic 173 proceeds to block 306 where the primary dirty flag PF (FIG. 1) is set "high" to indicate that the data on the first database 176a is "dirty."

If no alteration is detected in the first database 176a, then the logic 173 progresses to block 309 in which the logic 173 detects whether a status message 206 has been received from the secondary device 106. If so, then the logic 173 moves to block 313. Otherwise, the logic 173 progresses to block 316. In block 313, the logic 173 determines whether the first database 176a is "dirty" by examining the primary dirty flag PF. If the primary dirty flag PF is set "low," then the logic 173 moves to block 319 as neither the first nor the second databases 176a and 176b have experienced an alteration. In block 319 the logic 173 determines whether there is a sequence identifier mismatch between the primary and secondary devices 103 and 106. If there is no sequence mismatch, then the logic 173 reverts back to block 303 as no further action need be taken as the first and second databases 176a and 176b are still synchronized or equal.

On the other hand, if in block 313 the primary dirty flag PF is set "high," or if in block 319 there is a sequence mismatch, then the logic 173 skips to block 323 in which a synchronization 209 (FIG. 2) is performed. This reflects the fact that the second database 176b has not changed, but the first database 176a has changed, or a sequence mismatch has been discovered. Thus, the synchronization 209 in block 323 is performed to distribute the change in the first database 176a to both the primary and secondary devices 103 and 106 or to perform a synchronization to redo an unsuccessful synchronization performed previously.

However, where the logic 173 reaches block 316 from block 309, the logic 173 detects whether a synchronization request 226 has been received from the secondary device 106. If a synchronization request 226 from the secondary device 106 is detected in block 316, then the logic 173 progresses to block 326. Note that a synchronization request 226 from the secondary device 106 indicates that the second database 176b is "dirty" (has been altered), thereby necessitating synchronization of the first and second databases 176a and 176b to distribute the change.

In block 326 the logic 173 determines whether the first database 176a is "dirty" by examining the primary dirty flag PF. If the primary dirty flag is set "high" indicating that the primary database is "dirty" (has been altered), then the logic 173 progresses to block 329 in which the dirty first and second databases 176a and 176b are merged into a single merged database 253 (FIG. 4).

If the primary dirty flag PF is set low when examined in block 326, then the logic 173 moves to block 333. In block 333, the logic 173 determines whether a sequence mismatch exists between the current first and second databases 176a and 176b. If so, then the logic 173 moves to block 329 in which a merger operation 249 is performed so as to obtain a merged database 253 with an up to date sequence identifier. Note that the detailed functionality of the merger operation is performed by a merger subroutine and is discussed in further detail with reference to figures that follow. Ultimately, the merged database 253 takes into account all changes that have been made to both the first and second databases 176a and 176b.

However, if there is no sequence mismatch in block 333, then the logic 173 progresses to block 323 to perform a synchronization 209. After the synchronization 209 is performed, the logic 173 progresses to block 336 where the first database 176a which is equal to the merged database 253 is stored in memory as an original database to be employed by the merger subroutine as will be described. Thereafter, the logic 173 reverts back to block 303.

Figure 7:
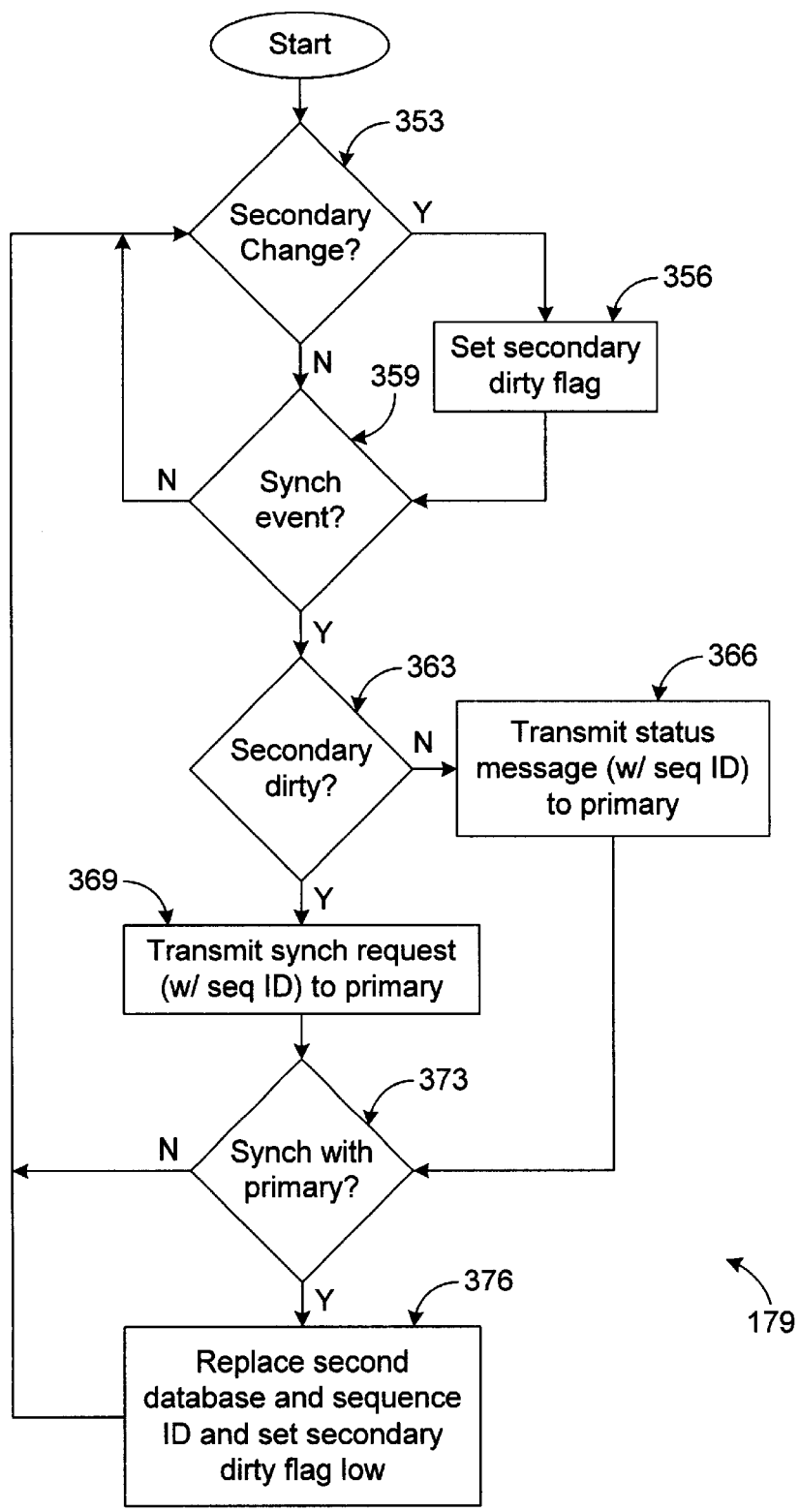
FIG. 7 is a flow chart of secondary synchronization logic executed by a secondary device in the database synchronization system of FIG. 1.

Turning then, to FIG. 7, shown is a flow chart of the secondary synchronization logic 179 executed by the secondary device 106 (FIG. 1) in performing the various tasks such as those illustrated by the foregoing scenarios. The logic 179 begins at block 353 in which the secondary device 106 detects whether a change has occurred in the second database 176b. This occurs, for example, if a user enters new records or alters existing records in the second database, etc., via the input devices 166. In the event that an alteration to the second database 176b is detected in block 353, then the logic 179 moves to block 356 in which the secondary dirty flag SF is set "high." If no alteration occurs, then the logic 179 progresses to block 359. Also, after the secondary dirty flag SF is set "high" in block 356, the logic 179 moves to block 359 as well.

In block 359 the secondary device 106 detects whether a synchronizing event has occurred that requires communication with the primary device 103 (FIG. 1) to effect a possible synchronization 209 if necessary. If no synchronizing event has occurred, such as, for example, establishing a data link between the primary and secondary devices 103 and 106, then the logic 179 reverts back to block 353. If a synchronizing event has occurred, then the logic 179 proceeds to block 363. Thus, in blocks 353, 356, and 359 the secondary device 106 will continuously monitor the second database 176b for alterations and then sets the secondary dirty flag SF when such alterations occur.

In block 363 the secondary device 106 is to transmit the information relative to the state of the second database 176b to the primary device 103 in light of the occurrence of the synchronizing event. The transmission may be either a status message 206 (FIG. 2) or a synchronization request 226. The secondary device 106 determines which of the two is transmitted by examining the secondary dirty flag SF. If the flag is set "low," then the logic 179 moves to block 366 in which a status message 206 with the current sequence identifier associated with the second database 176b is transmitted to the primary device 103. If the flag is set "high," then the logic 179 progresses to block 369 in which a synchronization request 226 is transmitted to the primary device 103. The synchronization request 226 includes a copy of the second database 176b (altered) and the current-sequence identifier associated therewith.

From both block 366 and 369, the logic 179 proceeds to block 373, where the secondary device 106 determines whether a synchronization 209 occurs based on the receipt of a new synchronized database from the primary device 103 with an accompanying sequence identifier. The logic 179 may make this determination by, for example, waiting for a predetermined period of time for a synchronization 209 from the primary device 103. Alternatively, the primary device 103 may transmit a "no synch necessary" message to the secondary device 106.

If a synchronization 209 occurs as detected in block 373, then the logic 179 progresses to block 376 in which the current second database 176b and associated sequence identifier is replaced with the new common database received from the primary device 103 and its associated sequence identifier. Also, the secondary dirty flag SF is set "low" if it is "high." Thereafter, the logic 179 reverts back to block 353.

Merger of Databases

Figure 8:
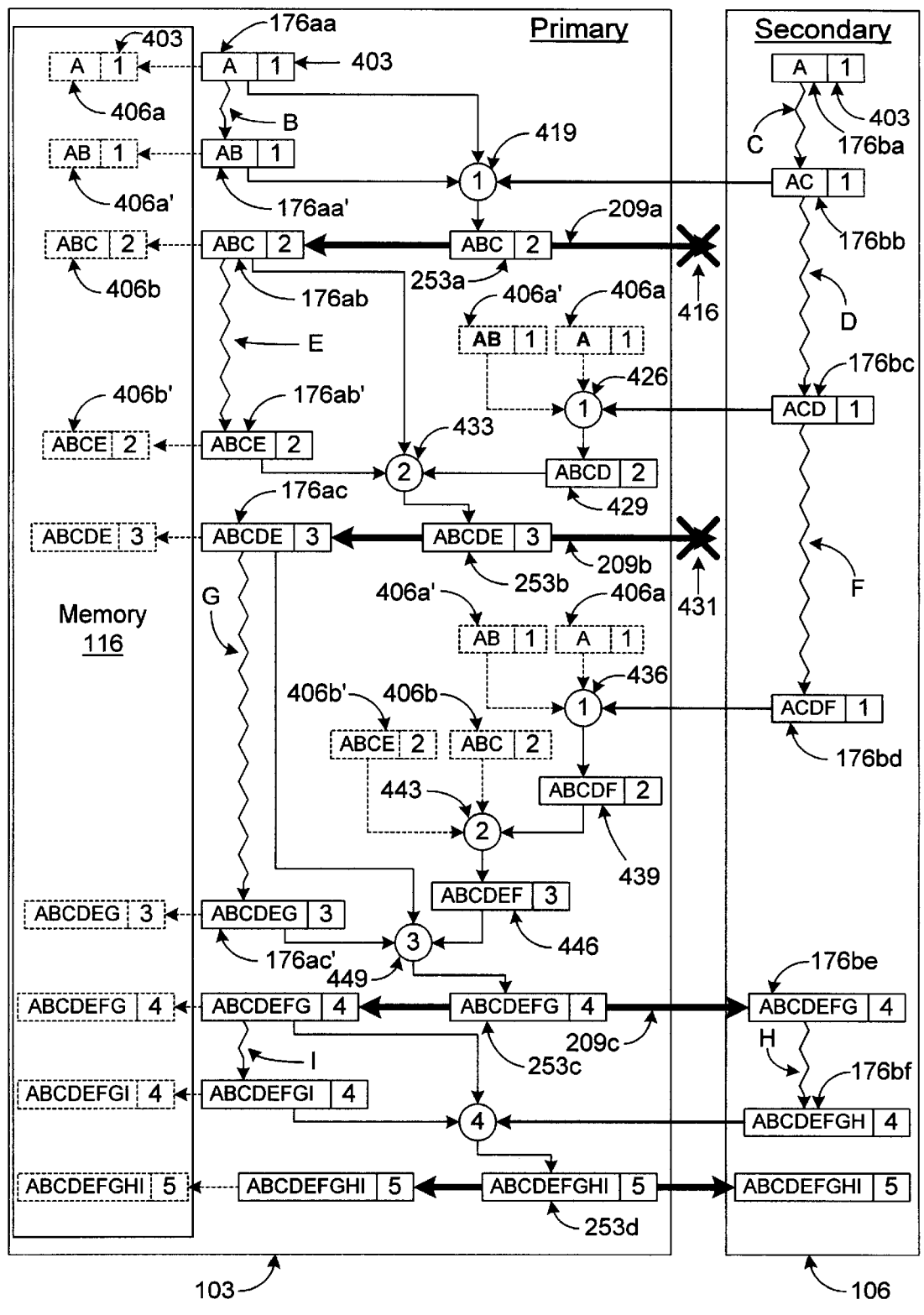
FIG. 8 is a block diagram of a scenario of failed synchronization operations according to the database synchronization system of FIG. 1.

Referring next to FIG. 8, shown is merger scenario 400 that may occur between the primary device 103 and the secondary device 106 according to another embodiment of the present invention. To begin, the primary device 103 includes the first database 176a a with content "A" and an associated sequence identifier 403 of "1." The secondary device 106 includes the second database 176ba with content "A" and a sequence identifier of "1." This means that, initially, the first and second databases 176aa and 176ba are identical, which may be the case, for example after a synchronization 209 (FIG. 3).

The first database 176aa is stored as an original database 406a with content "A" for the purposes of subsequent merger operations as will be discussed. To ensure that the original database 406a is not lost, it may be stored in non-volatile memory. Its sequence identifier 403 uniquely identifies the original database 406a. The original database 406a is termed "original" because it equals the content of a most recent merged database 253a and is the database that replaces the first and second databases 176aa and 176ba during synchronization 209.

According to the scenario 400, the first database 176aa with content "A" undergoes an alteration B, resulting in an altered first database 176aa' (with content "AB"). The altered first database 176aa' is stored in the memory 116 with the original database 406a as altered original database 406a' with content "AB" and with the accompanying sequence identifier of "1."

The second database 176ba with content "A" also experiences an alteration C, resulting in content "AC." The primary and secondary dirty flags PF and SF are both set "high" indicating the alterations made. Thereafter, in response to a synchronizing event, the second database 176bb with content "AC" along with the accompanying sequence identifier is transmitted to the primary device 103 with a synchronization request 226 (FIG. 3).

In the primary device 103, a "merger order" is determined based upon the value of the sequence identifier received from the secondary device 106. An association is drawn between the merger order and the sequence identifiers of either the current first database 176aa and the current altered first database 176aa', or the original and altered original databases 406a and 406a'. In this case, the sequencer value from the secondary device 106 that accompanies the second database 176bb is "1" and therefore, the merger order is "1." Thus, the first database 176aa and the altered first database 176aa', are identified because they have a sequence identifier of "1." Although the original database 406a and altered original database 406a' have a sequence identifier of "1," they are not identified as the first database 176aa and the altered first database 176aa' are accessed instead. In the ensuing discussion, it will be seen that this is not always the case in situations where one or more failed synchronizations 209 occur.

Thereafter, a merger 419 is performed as shown and a resulting merged database 253a with content "ABC" and sequence identifier of "2" results.

A synchronization 209a is then performed in which the merged database 253a with content "ABC" becomes the first database 176ab in the primary device 103 and is also transmitted to the secondary device 106 to replace the second database 176b. Note that the merged database with content "ABC" is also stored in a location in the memory 116 of the primary device 103 as original database 406b with the sequence identifier of "2." This original database 406b is stored for use in later merger operations as will be discussed.

However, according to the scenario 400, the synchronization 209a is incomplete as the merged database 253a with content "ABC" never reaches the secondary device 106 due to obstruction 416. Thus, the secondary device 106 maintains the second database 176bb with content "AC" and sequence identifier "1." Also, the secondary dirty flag SF still remains in a "high" state since the synchronization 209 failed to place it in a "low" state. The second database 176bb experiences further alteration D resulting in a second database 176bc with content "ACD."

Meanwhile, the primary device 103 assumes the synchronization 209 was successful. According to the scenario 400, the first database 176ab with content "ABC" undergoes further alteration E, resulting in an altered first database 176ab' with content "ABCE." At this point, another synchronizing event occurs and the secondary device 106 transmits the second database 176bc with content "ACD" and sequence identifier "1" to the primary device 103 in a synchronization request since the secondary dirty flag is set "high."

Based upon the received sequence identifier of "1" from the secondary device 106, the primary device 103 identifies the order of the merger operation to be undertaken. Note that the current sequence identifier of the first database 176ab and the altered first database 176ab' is "2" which is greater than the sequence identifier of "1" from the secondary device 106. Thus, a single reconstructive merger operation is necessary to make up for the fact that the merged database 253a never made it to the secondary device 106.

The primary device 103 draws an association between the merger order and the sequence identifier or the original database 406a (content "A") and the altered original database 406a' (content "AB") stored in memory 116 as they both have a corresponding sequence identifier of "1." A merger operation 426 with a merger order of "1" is then performed with the identified databases, thereby resulting in an interim second database 429 with content "ABCD" and a sequence identifier of "2."

The merger order is incremented from "1" to "2" and, thereafter, a merger operation 433 is performed with the first database 176ab, the altered first database 176ab', and the interim second database 429 to produce a merged database 253b with content "ABCDE" and a sequence identifier of "3."

Note then, that two merger operations are required to compensate for the previous failed synchronization 209a. The merger operation 426 (with merger order "1") is defined as a reconstructive merger operation as it reconstructs the interim second database 429 that is used in the merger operation 433.

According to the scenario 400, a second failed synchronization 209b occurs due to obstruction 431. In the primary device 103, the merged database 253b becomes first database 176ac. However, once again, the merged database 253b fails to reach the secondary device 106. The second database 176bc experiences further alterations F, resulting in a second database 176bd with content "ACDF" and sequence identifier of "1." The first database 176ac experiences alterations G, resulting in the altered first database 176ac' with content "ABCDEG." Thereafter, the second database 176bd is transmitted from the secondary device 106 to the primary device 103 in response to a synchronization request as discussed previously.

At this point, the primary device 103 is faced with a sequence identifier mismatch where the current primary sequence identifier of "3" is associated with the first database 176ac and the sequence identifier of "1" is received from the secondary device 106. Thus, to generate a merged database 253c, the primary device 103 performs a first reconstructive merger 436 having a merger order of "1" using original database 406a and altered original database 406a' from memory 116 along with second database 176bd to generate an interim second database 439. The primary device 103 then performs a second reconstructive merger 443 that results in interim second database 446 as shown. Finally, the merger operation 449 is performed, resulting in merged database 253c that is employed in a synchronization 209c as shown.

The scenario 400 illustrates the importance of storing previous versions of original databases and altered original databases to perform necessary reconstructive merger operations. Once a successful synchronization such as the synchronization 209c occurs, it is not necessary to maintain original databases and altered original databases with sequence numbers that are less than the resulting second database after the synchronization. For example, after synchronization 209c, the second database 176be has a sequence identifier of "4." The second database 176be may experience alteration H, resulting in second database 176bf that is transmitted to the primary device 103 in a synchronization request along with the sequence identifier of "4." Upon receiving the sequence identifier of "4," the primary device 103 knows that the previous synchronization 209c was successful. This means that all original databases and altered original databases with sequence numbers less than "4" may be purged from the memory 116 since they are no longer needed. In this manner, relatively small amounts of memory 116 may be employed to ensure reconstructive merger operations can be performed where necessary.

Figure 9:
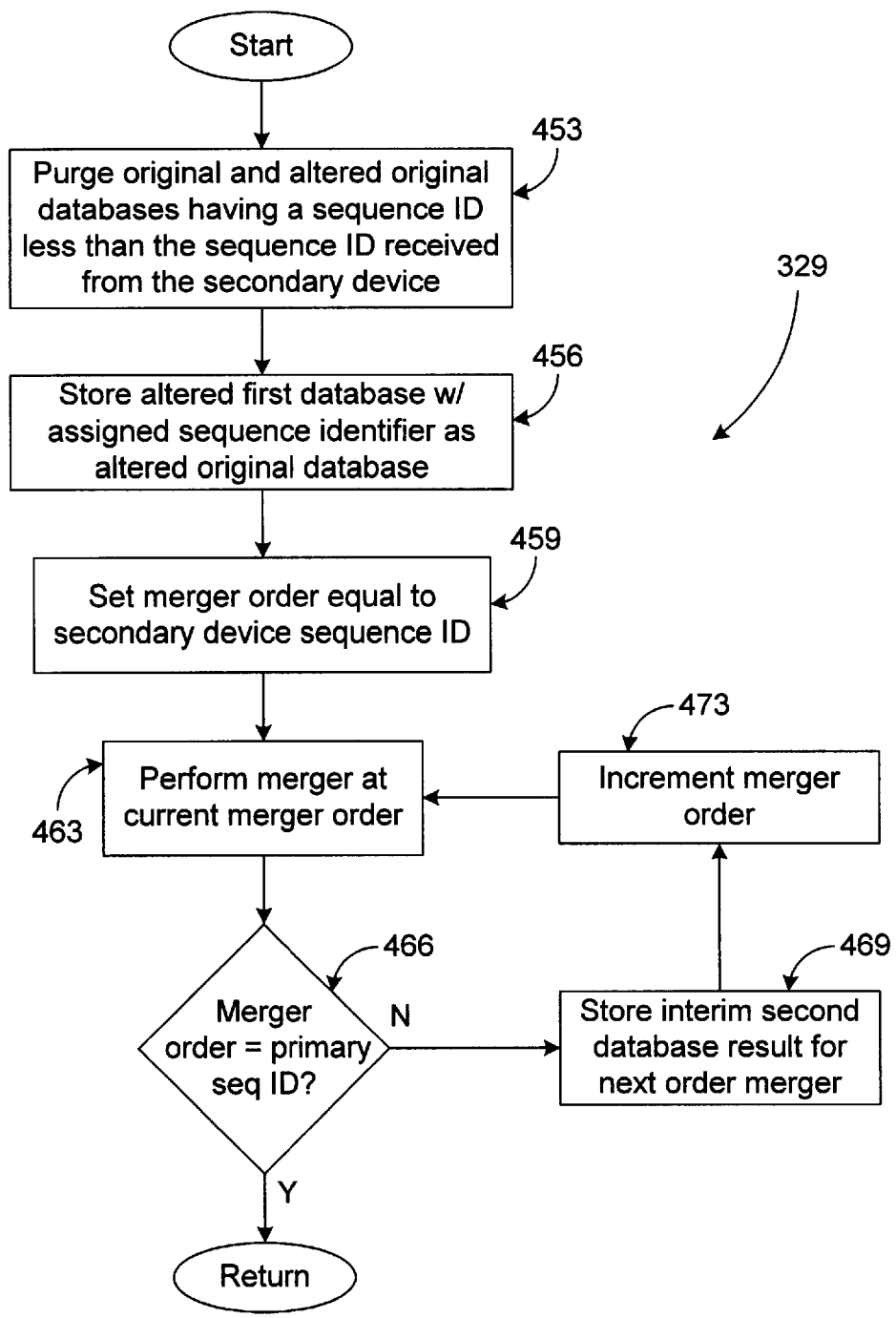
FIG. 9 is a flow chart of a merger subroutine executed as part of the primary synchronization logic of FIG. 6.

Turning then, to FIG. 9, shown is the merger subroutine 329 according to an embodiment of the present invention. Beginning with block 453, the merger subroutine 329 purges all original databases 406 and altered original databases 406' from the memory that have a sequence number that is less than the sequence identifier received from the secondary device 106 (less than the lowest merger order). This procedure is performed because there is no need to perform merger operations with such databases.

Thereafter, in block 456, the current altered first database 176a' is stored in the memory 116 as an altered original database 406' along with the accompanying sequence identifier. Then, in block 459 a merger order variable stored in the memory 116 is set equal to the sequence identifier from the secondary device 106. In block 463 a merger operation is performed at the current merger order. Note that the merger operation may or may not be a reconstructive merger operation, depending upon whether the merger order is less than the current sequence identifier of the primary device 103.

Next, in block 466, the merger subroutine 329 determines whether the current merger order is equal to the current sequence identifier of the primary device 103. Note that the current sequence identifier of the primary device 103 is the sequence identifier that is assigned to the latest first database 176a and the latest altered first database 176a'. If the merger order is equal to the current sequence identifier of the primary device 103, then the merger subroutine 329 ends and returns back to the logic 173 (FIG. 6). This is because the merger that was just performed resulted in the merged database 253 and no further merge operations need be undertaken. The logic 173 then moves on to perform a synchronization 209 as discussed with reference to FIG. 6.

On the other hand, if the merger order is not equal to the current sequence identifier of the primary device 103, then the merger subroutine 329 moves to block 469. In block 469 the result of the previous merger operation (a reconstructive merger) is temporarily stored for use as an interim second database to be applied to a subsequent merger operation. Thereafter, in block 473 the merger order variable is incremented by one or other appropriate interval and the merger subroutine 329 reverts back to block 463 to perform another merger operation.

Thus, the merger subroutine 329 performs the required number of merger operations to obtain a merged database 253 based upon a merger order that is first determined from the sequence identifier from the secondary device 106. In this manner, failed synchronizations are reconstructed and no alterations made to either the first or second databases 176a and 176b are lost.

Figure 10:
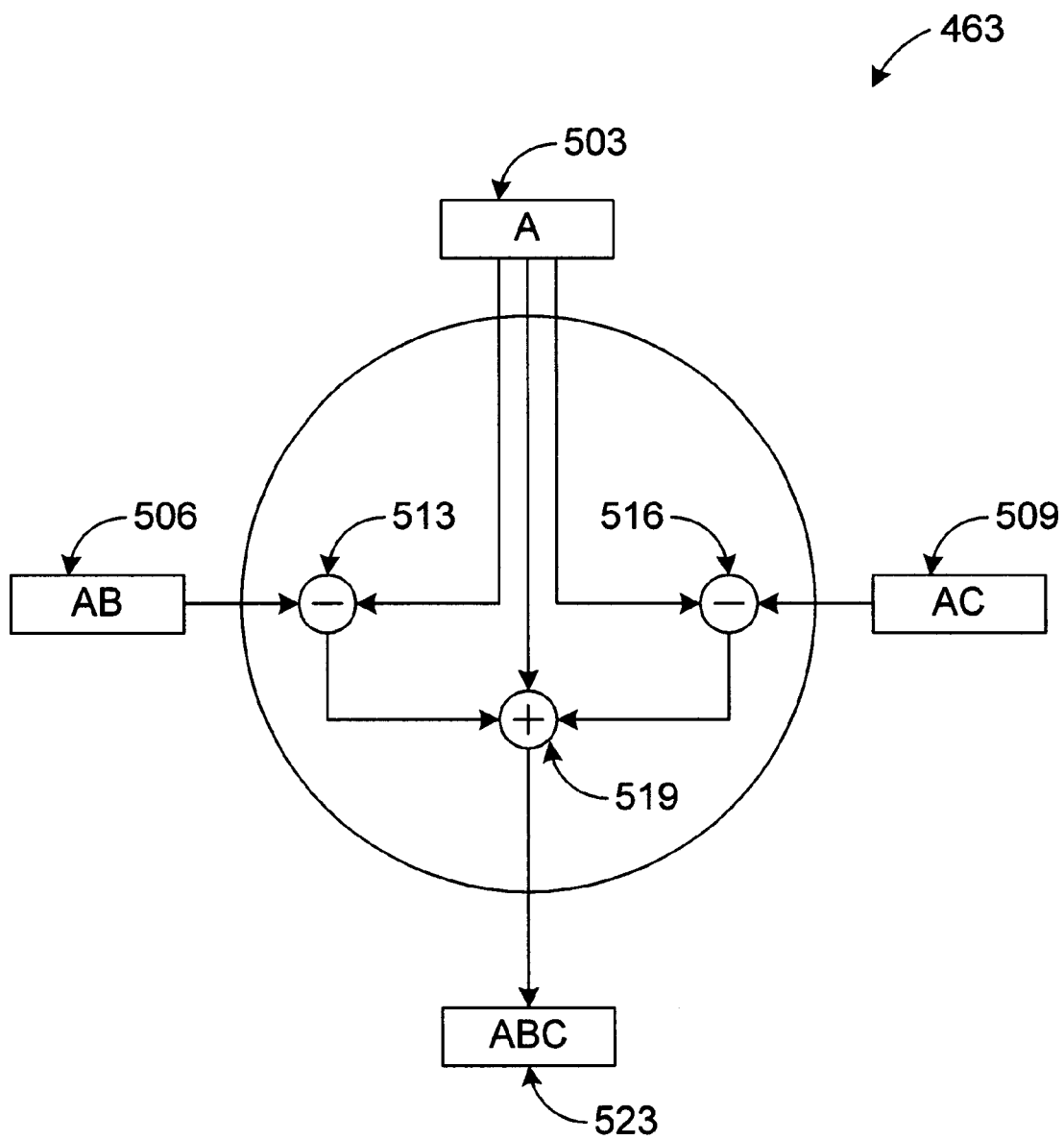
FIG. 10 is a block diagram of a merger operation performed by the merger subroutine of FIG. 9.

Referring to FIG. 10, shown is a block diagram of a merger operation performed in block 463 of FIG. 9. The merger operation 463 requires a first database 176a/original database 406a (hereafter "original database 503"), an altered first database 176a'/altered original database 406a' (hereafter "first altered database 506"), and a second database 176b (hereafter "second database 509").

The first altered database 506 and the second database 509 should be derived from the original database 503 in order for the merger operation 463 to be effective. Essentially the merger operation 463 includes a first subtraction task 513 to which the original database 503 and the first altered database 506 are applied as inputs. Given that the original database 503 has a content "A" and the first altered database 506 has content "AB," the resulting output is the isolated alteration "B."

Likewise, the merger operation 463 includes a second subtraction task 516 to which the original database 503 and the second database 509 are applied as inputs. Given that the original database 503 has a content "A" and the second database 509 has content "AC," the resulting output is the isolated alteration "C." The isolated alterations "B" and "C" and the original database 503 are then applied to a summing task 519 that outputs a merged database 523 with content "ABC."

With reference to FIGS. 11A–11D, shown are a number of exemplary databases to illustrate the merger operation of block 463 (FIG. 10). To provide an illustration, FIG. 11A shows an original database 603 that comprises records having two entries, namely, a unit designation 606 and a name of a person 609 associated therewith. The unit designation 606 may identify, for example, a particular address or other parameter of a communications device through which one may communicate with the person 609. FIG. 11B shows a first database 176a derived from the original database 603 and a second database 176b that is also derived from the original database 603. That is to say that the first and second databases 176a and 176b were identical to the original database 603 and received various updates in the primary and secondary devices 103 and 106, respectively.

The updates that are applied to the first and second databases 176a and 176b fall within one of two categories. First are "order" updates that refer to updates that modify the position of a record among the records in a database, and second are "entry" updates that refer to the modification, deletion, or addition of records.

FIG. 11C shows a first update isolation graph 613 and a second isolation graph 616 that isolate the updates applied to the first and second databases 176a and 176b, respectively. In merging the first and second databases 176a and 176b, merger rules are applied that guide the process. Below are a number of merger rules that may be employed. However, it is understood that other rules not listed herein may be applied as well.

MERGER RULES

1. Order updates and entry updates are treated independently from each other except that deletion of a record negates an order update relating to that record.
2. Every type of update has the same priority.
3. If a record has not been updated, there will be no change to that record in merger operation.
4. If a record has been updated in only one of the first and second databases, the update will be applied.
5. If a record has been updated identically in both the first and second databases, the update will be applied.
6. If a record has been updated in both the first and second databases and the updates conflict, then the update made in the primary device takes precedence.

In FIG. 11C, the first and second update isolation graphs 613 and 616 illustrate the particular updates applied to the first and second databases 176a and 176b. The first database 176a was updated as follows: the first record "XXX123, John" was deleted; the fourth record "XXX789, Susan" was modified to "XXX789, Aunt Susan"; the fifth record "XXX333, Mary" was modified to "XXX333, Mary Ann"; and the sixth record "XXX676, William" was modified to "XXX676, Bill." The second database 176b was updated as follows: the first record "XXX123, John" was deleted; the second record "XXX345, Mom" was modified to "XXX345, Mother"; the fourth record "XXX789, Susan" was modified to "XXX789, Aunt Susie"; and the order of the fifth record "XXX333, Mary" was modified.

Applying the merger rules to the updates above results in the merged database 253. Specifically, with reference to the original database 603, the first record "XXX123, John" was deleted in both the first and second databases 176a and 176b, and therefore stands deleted. The second record "XXX345, Mom" was altered in the secondary device 106 alone and, therefore, the update is applied to the merged database 253. The third record "XXX567, Uncle Bob" was unchanged in both the first and second databases and remains unchanged in the merged database 253. The fourth record "XXX789, Susan" was modified in both the first and second databases 176a and 176b. Consequently, the modification from the primary device 103 is applied to the merged database 253. The fifth record "XXX333, Mary" was modified in the primary device 103 and the order of the same record was modified in the secondary device 106. Although these updates occurred to the same record, they do not conflict and, therefore, both are applied to the merged database 253. Finally, the sixth record "XXX676, William" was modified in the first database 176a alone and, therefore the modification is applied to the merged database 253.

In addition to the foregoing discussion, the logic 173 and 179 of the present invention can be implemented in hardware, software, firmware, or a combination thereof. In the preferred embodiment(s), the logic 173 and 179 is implemented in software or firmware that is stored in a memory and that is executed by a suitable instruction execution system. If implemented in hardware, as in an alternative embodiment, the logic 173 and 179 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Also, the flow charts of FIGS. 6, 7, and 9 show the architecture, functionality, and operation of a possible implementation of the logic 173 and 179. In this regard, each block represents a module, segment, or portion of code, which comprises one or more executable instructions for implementing the specified logical function(s). It should also be noted that in some alternative implementations, the functions noted in the blocks may occur out of the order noted in FIGS. 6, 7, and 9. For example, two blocks shown in succession in FIGS. 6, 7, and 9 may in fact be executed substantially concurrently or the blocks may sometimes be executed in the reverse order, depending upon the functionality involved.

Finally, the logic 173 and 179, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A method for maintaining a database in a primary device and in a secondary device, comprising the steps of:
   determining a need for a merger of a first database maintained in the primary device and a second database maintained in the secondary device, wherein the first and second databases are derived from a common database;
   maintaining a primary dirty flag in the primary device, the primary dirty flag indicating that a content of the first database has been altered and potentially does not coincide with a content of the second database maintained in the secondary device;
   merging the first database and the second database, resulting in a merged database;
   assigning a sequence identifier to the merged database; and
   synchronizing the merged database in the primary and secondary devices by transmitting the merged database in its entirety and the sequence identifier from the primary device to the secondary device.

2. The method of claim 1, wherein the step of determining a need for a merger further comprises the step of setting a primary dirty flag upon an occurrence of an alteration to the first database.

3. The method of claim 1, wherein the step of determining a need for a merger further comprises the step of setting a secondary dirty flag upon an occurrence of an alteration to the second database.

4. The method of claim 1, wherein the step of determining a need for a merger further comprises the step of transmitting an alteration status of the second database in the secondary device to the primary device, the alteration status being indicated by a state of a secondary dirty flag.

5. A system in a primary device for maintaining a database in the primary device and in a secondary device, comprising:
   a processor electrically coupled to a local interface;
   a memory electrically coupled to the local interface; and
   primary synchronization logic stored on the memory and executed by the processor, the primary synchronization logic including:
      logic to determine a need for a merger of a first database maintained in the primary device and a second database maintained in the secondary device, where the first and second databases are derived from a common database;
      a primary dirty flag maintained in the memory that indicates that a content of the first database has been altered and potentially does not coincide with a content of the second database maintained in the secondary device;
      logic to merge the first and second databases, resulting in a merged database;
      logic to assign a sequence identifier to the merged database; and
      logic to synchronize the merged database in the primary and secondary devices by transmitting the merged database in its entirety and the sequence identifier from the primary device to the secondary device.

6. The system of claim 5, further comprising logic to set a primary dirty flag to indicate an occurrence of an alteration to the first database.

7. The system of claim 5, wherein the primary synchronization logic further comprises logic to detect a secondary dirty flag received from the secondary device.

8. A system in a primary device for maintaining a database in the primary device and in a secondary device, comprising:
   means for determining a need for a merger of a first database maintained in the primary device and a second database maintained in the secondary device, where the first and second databases are derived from a common database;
   means for maintaining a primary dirty flag that indicates that a content of the first database has been altered and potentially does not coincide with a content of the second database maintained in the secondary device;
   means for merging the first and second databases, resulting in a merged database;
   means for assigning a sequence identifier to the merged database; and
   means for synchronizing the merged database in the primary and secondary devices by transmitting the merged database in its entirety and the sequence identifier from the primary device to the secondary device.

9. A system in a secondary device for maintaining a database in a primary device and in the secondary device, comprising:
   a processor electrically coupled to a local interface;
   a memory electrically coupled to the local interface;
   secondary synchronization logic stored on the memory executed by the processor, the secondary synchronization logic including:
      logic to receive and store a second database from the primary device, the second database being identical to a first database stored in the primary device;
      logic to receive and store a sequence identifier from the primary device, the sequence identifier being associated with the second database;

logic to maintain an alteration status of the second database; and logic to detect an alteration status request from the primary device and to transmit the alteration status of the second database to the primary device in response to the alteration status request.

10. The system of claim 9, wherein the logic to maintain an alteration status of the second database further comprises logic to maintain a state of a secondary dirty flag.

11. A system in a secondary device for maintaining a database in a primary device and in the secondary device, comprising:

means for receiving and storing a second database from the primary device, the second database being identical to a first database stored in the primary device;

means for receiving and storing a sequence identifier from the primary device, the sequence identifier being associated with the second database;

means for maintaining an alteration status of the second database; and means for detecting an alteration status request from the primary device and for transmitting the alteration status of the second database to the primary device in response to the alteration status request.

12. A method in a secondary device for maintaining a database in a primary device and in the secondary device, comprising:

receiving and storing a second database from the primary device, the second database being identical to a first database stored in the primary device;

receiving and storing a sequence identifier from the primary device, the sequence identifier being associated with the second database;

maintaining an alteration status of the second database; and detecting an alteration status request from the primary device and transmitting the alteration status of the second database to the primary device in response to the alteration status request.

* * * * *